Jan. 7, 1941. A. C. MILLER 2,228,174
RADIO RECEIVER
Filed June 5, 1939 2 Sheets-Sheet 1

Inventor
Ambrose C. Miller
by his Attorneys
Howson & Howson

Jan. 7, 1941.   A. C. MILLER   2,228,174
RADIO RECEIVER
Filed June 5, 1939   2 Sheets-Sheet 2

Inventor
Ambrose C. Miller
by his Attorneys
Howson & Howson

Patented Jan. 7, 1941

2,228,174

UNITED STATES PATENT OFFICE 2,228,174

RADIO RECEIVER

Ambrose C. Miller, Jenkintown, Pa., assignor, by mesne assignments, to Philco Radio and Television Corporation, Philadelphia, Pa., a corporation of Delaware Application June 5, 1939, Serial No. 277,543

2 Claims. (Cl. 250—20)

This invention relates to improvements in radio receivers and the like, and more particularly to novel means for reducing background noise level in radio receivers employing resonant loop antennas. The principal object of the invention is to provide a simple but effective method and means for reducing the noise level in such receivers.

In order to improve the portability of radio receivers and to simplify their installation, it has been found desirable to include within the cabinet, or housing, of the radio receiver a tunable loop antenna which may be employed as a means for abstracting energy from a passing carrier wave signal in place of the more usual outdoor antenna structure. However, in A. C. operated radio receivers equipped with such loop antennas, as constructed heretofore, the signal-to-noise ratio has been objectionably high and presented a substantial problem. For example, in one instance the noise level was found equal to that which would be produced by a 20 microvolt input signal, whereas normally only two microvolts of noise might have been expected under the conditions of the test.

Extensive investigation prior to the present invention failed to determine the cause of this defect and the problem remained unsolved up to the time of this invention. The failure of such prior investigation to locate the source of the interfering noise, or its cause, was due at least in part to the fact that listening tests failed to disclose any unusual characteristics in the noise which might have aided in suggesting or localizing its source. The character of the noise was, in fact, such as to be definitely misleading since it was very similar in quality to that due to the thermal noises and shot effects common in vacuum tube amplifiers, being generally in the nature of a relatively steady hiss, but investigation failed to trace the noise to such common causes. Equally futile were investigations of the intermediate frequency amplifier stages to determine whether they were on the verge of oscillation, a condition which may produce a somewhat similar hiss. Since only the signals of powerful local stations were enabled satisfactorily to override the noise background, it was thought that the unfavorable signal-to-noise ratio might be due to the inefficiency of the loop as a signal collector, but this did not prove to be the case. Further, investigation was made to determine whether the noise might be entering the receiver by way of the power line, and, accordingly, the parts of the receiver associated therewith were particularly well filtered, but again with no improvement in the condition.

Despite the thoroughness of such investigations, the problem remained unsolved until the solution thereof by the present invention. This invention resides primarily in the discovery of the cause of the above-mentioned defect and secondarily in the provision of simple means for curing the defect.

The invention may be clearly understood by reference to the accompanying drawings in which.

Referring to the several views of the drawings, there is illustrated in somewhat schematic form an A. C. operated radio receiver employing a loop antenna. The present invention resides primarily in the discovery that the above-mentioned defect heretofore encountered in a receiver of this type was caused by voltages generated by the power transformer, which in turn induced relatively large noise voltage signals in the loop antenna. The antenna, being necessarily in close proximity to the radio receiver elements including the power transformer, is susceptible to the noise signals. Strangely, too, I have discovered that the power transformer is prone to generate voltages of radio frequencies well up into, and even above, the broadcast band. The resulting disturbances are of a magnetic nature and are readily capable of inducing large noise signals in the loop antenna. It is not precisely understood how the transformer supplied with 60 cycle alternating current, is enabled to generate strong magnetic disturbances of frequencies greater than a megacycle. It may be due, however, to harmonics of the distorted charging current and to the fact that the magnetization curve of iron is not a smooth curve but is actually made up of small but finite abrupt changes in magnetization.

I have discovered further that the above-mentioned defect may be effectively eliminated by the simple procedure of providing a suitable shield between the power transformer and the loop antenna.

Figure 1:
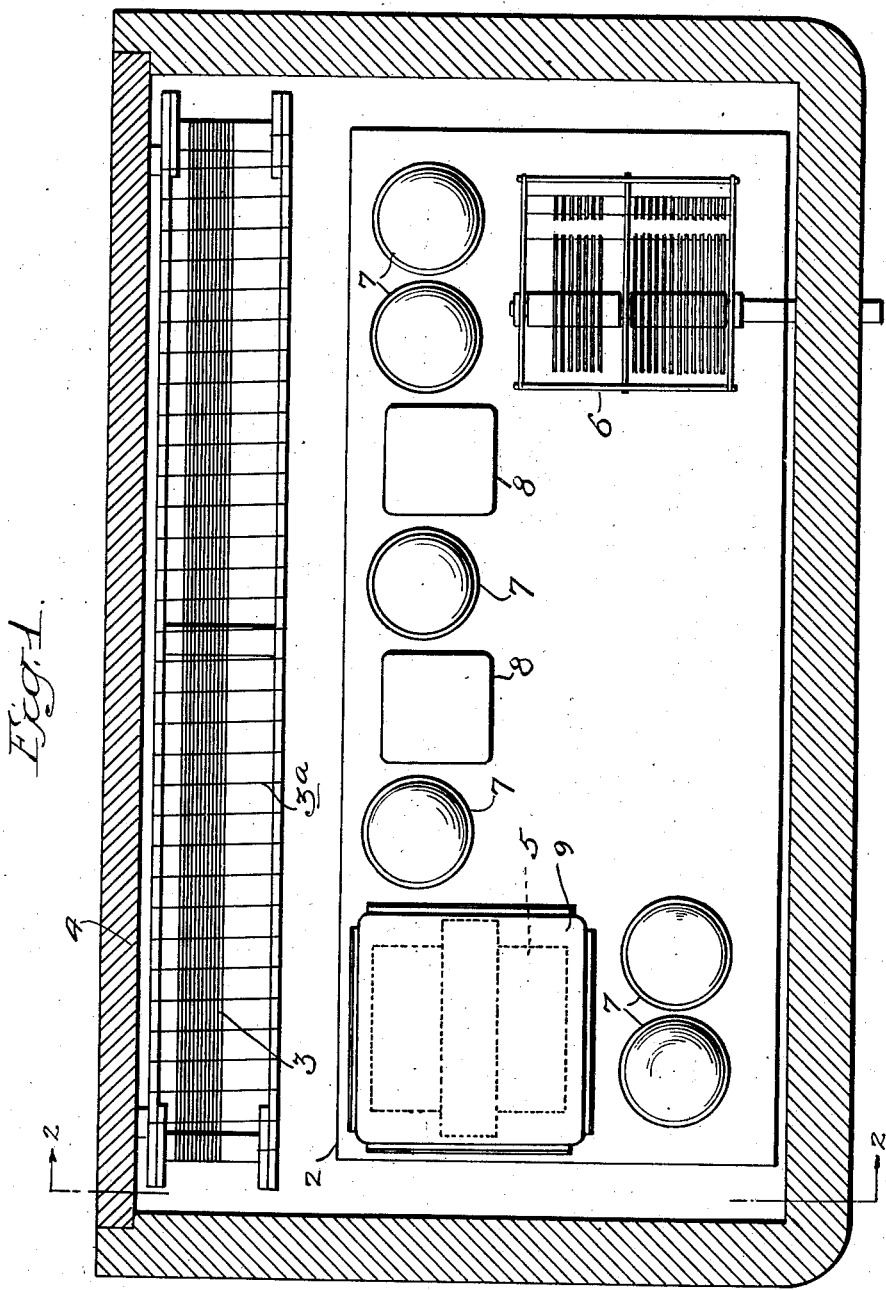
Figure 1 is a sectional plan view of a radio receiver constructed according to the invention and showing the principal elements of the receiver.
Figure 2:
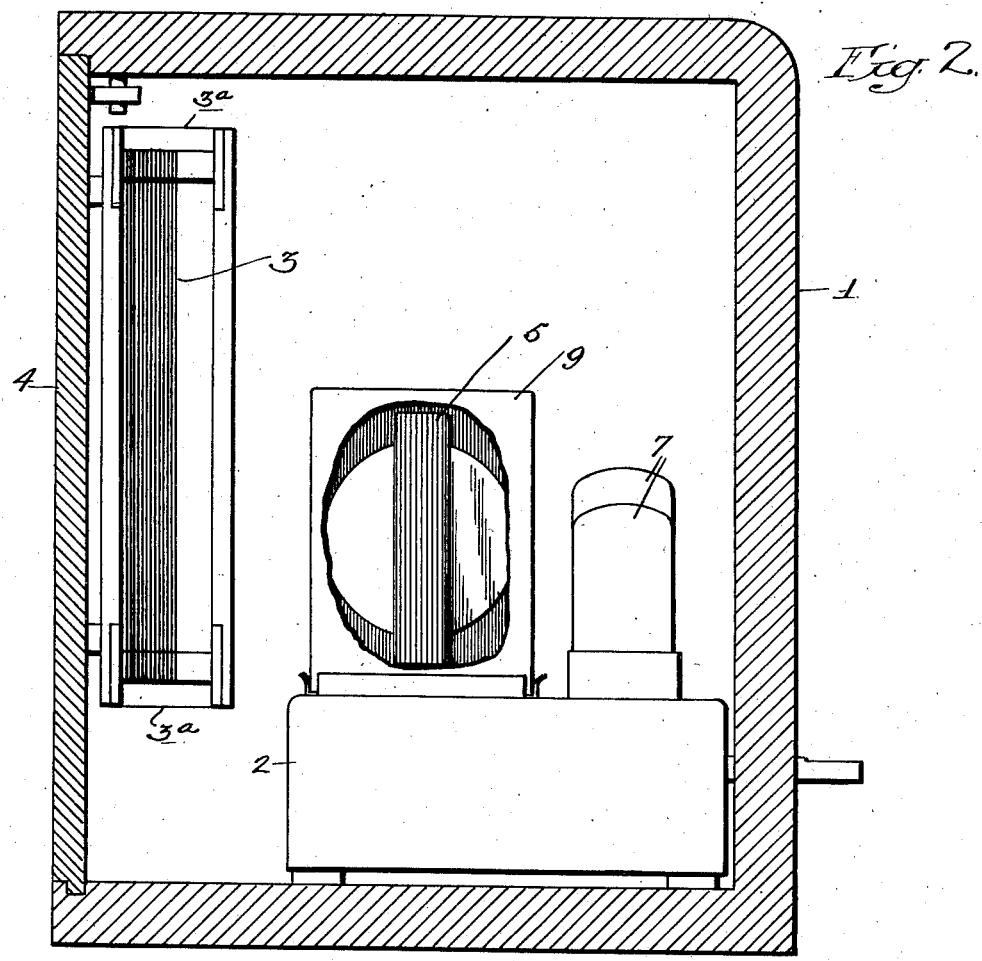
Fig. 2 is a sectional view taken along line 2—2 of Fig. 1.

In Figs. 1 and 2, there is shown a cabinet or casing 1 within which there are disposed the receiver chassis 2 carrying the receiver elements, and a loop antenna 3, which is illustrated as being mounted on the removable rear panel 4 of the cabinet. Among the elements mounted on the chassis are the power transformer 5, the gang tuning condenser 6, the various tubes designated generally by reference character 7, coupling transformers 8, and other elements not shown. The loop antenna 3 may be of any suitable form, but is preferably of the type illustrated, which is disclosed and claimed in a copending application of William H. Grimditch, Serial No. 277,550, filed June 5, 1939, and which comprises an electrostatic shield winding 3a about the loop winding to discriminate against electrostatic interference, as described in the said copending application. The loop antenna may be tuned to resonance for any desired carrier frequency by means of a section of the tuning condenser gang 6 connected in shunt with the loop, as illustrated in Fig. 3.

It will be noted that the power transformer 5 and the loop antenna 3 are in close proximity to one another. Obviously, the invention is not restricted to the particular relative location of parts shown, but it will be understood that in general in radio receivers of the table or console model types the separation between the loop 3 and the source of noise or interference (the transformer 5) will be relatively small. In fact, in many receivers of the table model types, the transformer and loop may be separated by only a few inches, or even less.

In accordance with the invention, the loop antenna is shielded from the power transformer by suitable means capable of preventing the above-mentioned high frequency magnetic disturbances from affecting the loop. Such means preferably comprises a shielding can 9, placed around or enclosing the transformer. Because of the high frequency nature of the disturbances, the transformer may best be shielded by means of a shield can having a relatively low permeability, such as one fashioned from low gauge tinned steel, or even from non-magnetic materials such as copper or aluminum. It is important that the transformer be fully shielded and that the transformer core be at no point exposed to the loop, nor employed as a part of the shielding structure.

Figure 3:
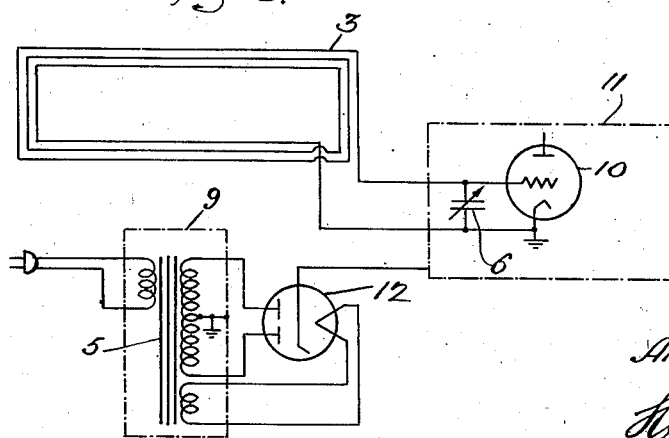
Fig. 3 is a diagrammatic illustration of the electrical elements involved.

In Fig. 3 there is illustrated diagrammatically the portion of the receiver with which the invention is particularly concerned. The portions of the receiver not illustrated may be conventional except for the possibilities mentioned hereinafter.

The tuned loop antenna is connected to the input tube 10 of the receiver indicated generally at 11. The power supply comprises the transformer 5 and rectifier tube 12 which supplies the receiver in conventional manner. The shield 9 is shown in dot and dash outline completely closing the transformer 5.

It is, of course, known to shield loop antennas electrostatically in order to protect them from nearby sources of electrostatic disturbance. Thus, in the drawings the wound shield 3a, grounded at some point along its length, is supplied for that purpose. Such a shield, however, offers no protection whatever against magnetic disturbances of the type described, and since it is obviously impossible to shield the loop magnetically, and still preserve its operation as a loop, it is apparent that as the alternative, the shielding must be applied to the transformer.

The invention, while directed particularly to the shielding of loop antennas, is applicable also to radio receivers other than those employing loop antennas, and is generally applicable wherever relatively large radio frequency, or intermediate frequency coils, are employed in an unshielded state in the vicinity of power transformers, or more generally, wherever such high frequency coils are employed in the vicinity or field of ferro-magnetic inductive devices operating at power-, audio-, or other low frequencies. For example, in the case of radio receivers employing a long-wave or weather band, it has been noted that the background noise is often unusually high as compared to that experienced in the higher frequency bands. The antenna and/or radio frequency coils employed in the long wave bands comprise a relatively large number of turns, and are thus, in spite of their relatively small overall dimensions, especially subject to pickup of magnetic disturbances. This condition may be relieved by providing the power transformer with a low permeability shield as hereinbefore described.

It is, of course, further contemplated that the invention may be applied to receivers wherein high power audio transformers are closely associated with loop antennas or the like, and where radio frequency noise voltages are induced in the loop thereby. In such an event, the audio transformer may be shielded as above described.

Although the invention has been described with particular reference to loop equipped radio receivers and to the embodiment of the drawings, it will be understood that the invention is capable of other forms of physical expression, and is, therefore, not to be limited to the specific disclosure, but only by the scope of the appended claims.

I claim:

1. In a carrier wave receiving system, a housing adapted to enclose the elements of said system, power supply means in said housing including a rectifier and a power transformer for supplying direct current to said receiving system from an alternating current power source, the frequency of the received carrier waves being of the order of thousands of times greater than the frequency of the alternating current from said power source, a loop antenna within said housing in proximity to said power transformer, and a low permeability metallic enclosure about said power transformer for confining therein magnetic disturbances emanating from said transformer and having frequencies of the order of the received carrier waves, whereby said high frequency disturbances are prevented from affecting said loop antenna.

2. In a compact radio receiver having all elements mounted within a small non-metallic housing, power supply means within said housing including a rectifier and a power transformer for supplying direct current to said receiving system from an alternating current power source having a frequency of not substantially more than 60 cycles per second, said transformer tending to generate undesired magnetic wave disturbances having frequencies of the order of thousands of times the frequency of the current from said power source, a loop antenna disposed within said housing and being necessarily in proximity to said power transformer, and a metallic shield substantially completely enclosing said power transformer for shielding said loop antenna from the magnetic wave disturbances generated in said transformer.

AMBROSE C. MILLER.